(12) United States Patent
Skelly

(10) Patent No.: US 8,793,751 B2
(45) Date of Patent: Jul. 29, 2014

(54) MEASUREMENT OF VIDEO QUALITY AT CUSTOMER PREMISES

(71) Applicant: Verizon Laboratories Inc., Arlington, VA (US)

(72) Inventor: Paul A. Skelly, Needham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 13/828,931

(22) Filed: Mar. 14, 2013

(65) Prior Publication Data

US 2013/0205356 A1 Aug. 8, 2013

Related U.S. Application Data

(63) Continuation of application No. 11/510,361, filed on Aug. 25, 2006, now Pat. No. 8,424,049.

(51) Int. Cl.
*H04N 17/04* (2006.01)
*H04N 17/00* (2006.01)

(52) U.S. Cl.
CPC .............. *H04N 17/04* (2013.01); *H04N 17/004* (2013.01)
USPC ............ 725/107; 725/131; 725/151; 348/192

(58) Field of Classification Search
CPC .............................. H04N 17/04; H04N 17/004
USPC .................................... 725/107; 348/192, 193
See application file for complete search history.

(56) References Cited

U.S. PATENT DOCUMENTS

| | | | |
|---|---|---|---|
| 5,818,520 A * | 10/1998 | Janko et al. | 348/192 |
| 6,160,991 A | 12/2000 | Chappell et al. | |
| 6,633,651 B1 | 10/2003 | Hirzalla et al. | |
| 6,734,898 B2 * | 5/2004 | Zeidler | 348/183 |
| 7,607,148 B2 * | 10/2009 | Feinberg et al. | 725/22 |
| 2001/0026630 A1 | 10/2001 | Honda | |
| 2002/0150102 A1 | 10/2002 | Janko | |
| 2002/0184645 A1 | 12/2002 | Austin | |
| 2003/0204592 A1 | 10/2003 | Crouse-Kemp et al. | |
| 2004/0160622 A1 | 8/2004 | Kawada | |
| 2005/0031226 A1 | 2/2005 | Sugimoto | |
| 2006/0023067 A1 | 2/2006 | Yang | |
| 2006/0168629 A1 * | 7/2006 | Weng et al. | 725/81 |

FOREIGN PATENT DOCUMENTS

EP 0938239 8/1999

* cited by examiner

*Primary Examiner* — Bennett Ingvoldstad

(57) ABSTRACT

A video signal is provided to a set top box. An instruction to record a specified portion of the video signal, thereby creating a video sample, is provided to the set top box. The video sample is received from the set top box. Reference video corresponding to the video sample is obtained. A comparison of the video sample and the reference video is performed.

19 Claims, 2 Drawing Sheets

MEASUREMENT OF VIDEO QUALITY AT CUSTOMER PREMISES

CROSS REFERENCE TO RELATED APPLICATIONS

This application is a continuation of U.S. patent application Ser. No. 11/510,361, filed on Aug. 25, 2006, which is hereby incorporated by reference in its entirety.

BACKGROUND INFORMATION

Video services such as video on demand, broadcast video, etc. may be provided to customers via a variety of different kinds of video distribution networks. One factor in determining the quality of a video signal provided to a customer is the quality of the video feed supplied to the head end of a video distribution network. A video feed may be supplied to a head end by satellite, and therefore is subject to the quality of satellite communications, and further may be subject to natural phenomena such as solar flares, depending on the location of a satellite and the location of a head end. Further, in certain kinds of video distribution networks, such as a digital optical network, network congestion can adversely affect video quality.

Moreover, a video distribution network used to provide video services generally includes a number of different components that may affect video quality. For example, after entering a video distribution network at a head end, a video signal may traverse a number of different links and switches, and in some cases is converted from an analog signal to a digital signal, or vice versa. Moreover, the configuration of components in a video distribution network may affect the quality of video received at customer premises. For example, a digital switch may be configured to fail over to another switch when a bit error rate exceeds a predetermined threshold, although the quality of video that is received by the customer may be affected before the predetermined threshold is reached. Similarly, it will be understood that the carrier-to-noise-ratio allowed in a video distribution network may affect the quality of video that may be received by a customer.

Unfortunately, it is presently difficult to determine the quality of video actually received at customer premises. Certain methods that purport to directly measure video quality at a customer premises in fact directly measure quality at some point in a video distribution network upstream of the customer premises, and then apply mathematical techniques to predict, rather than actually measure, video quality at a customer premises. At best, only indirect indicators of signal quality, such as signal-to-noise ratio, carrier-to-noise ratio, signal level, etc. may presently be measured at a customer premises.

For example, various performance metrics are identified in ITU-T Prepublished Recommendation G.1050 "Network model for evaluating multimedia transmission performance over internet protocol," published by the International Telecommunications Union (ITU) of Geneva Switzerland in November 2005, and fully incorporated herein by reference in its entirety. Such performance metrics include one-way latency, "jitter" (variability in latency), duration of sequential packet loss ("burst"), rate (frequency) of sequential packet loss, proportion of packets lost, and proportion of reordered packets, etc. Some vendors sell equipment for measuring certain of these metrics, e.g., Spirent® Communications, of West Sussex, United Kingdom.

However, known performance metrics are unfortunately at best imperfect predictors of the subjective quality of the output video as viewed by human observers. Full-reference video quality metrics (FR-VQM), e.g., metrics that directly measure video quality are generally thought to be better predictors of subjective quality. However, while systems and methods for correlating network performance metrics and FR-VQM are generally known and include graphical "scatter plots" and computed Pearson and Spearman correlation coefficients, present systems and methods do not provide any way to correlate network performance metrics, such as mentioned above, and high quality full-reference metrics in a video network because present systems and methods provide for no way in which to acquire and evaluate high quality video that has gone end-to-end, i.e., from a head end, to a customer premises equipment, and back. Having both a full-reference metric and network performance metrics would be quite valuable because a full-reference metric gives a more reliable indicator of subjective quality of the output video, while network performance metrics provide more useful diagnostic information for identifying and addressing network problems.

DETAILED DESCRIPTION OF THE PREFERRED EMBODIMENTS

Figure 1:
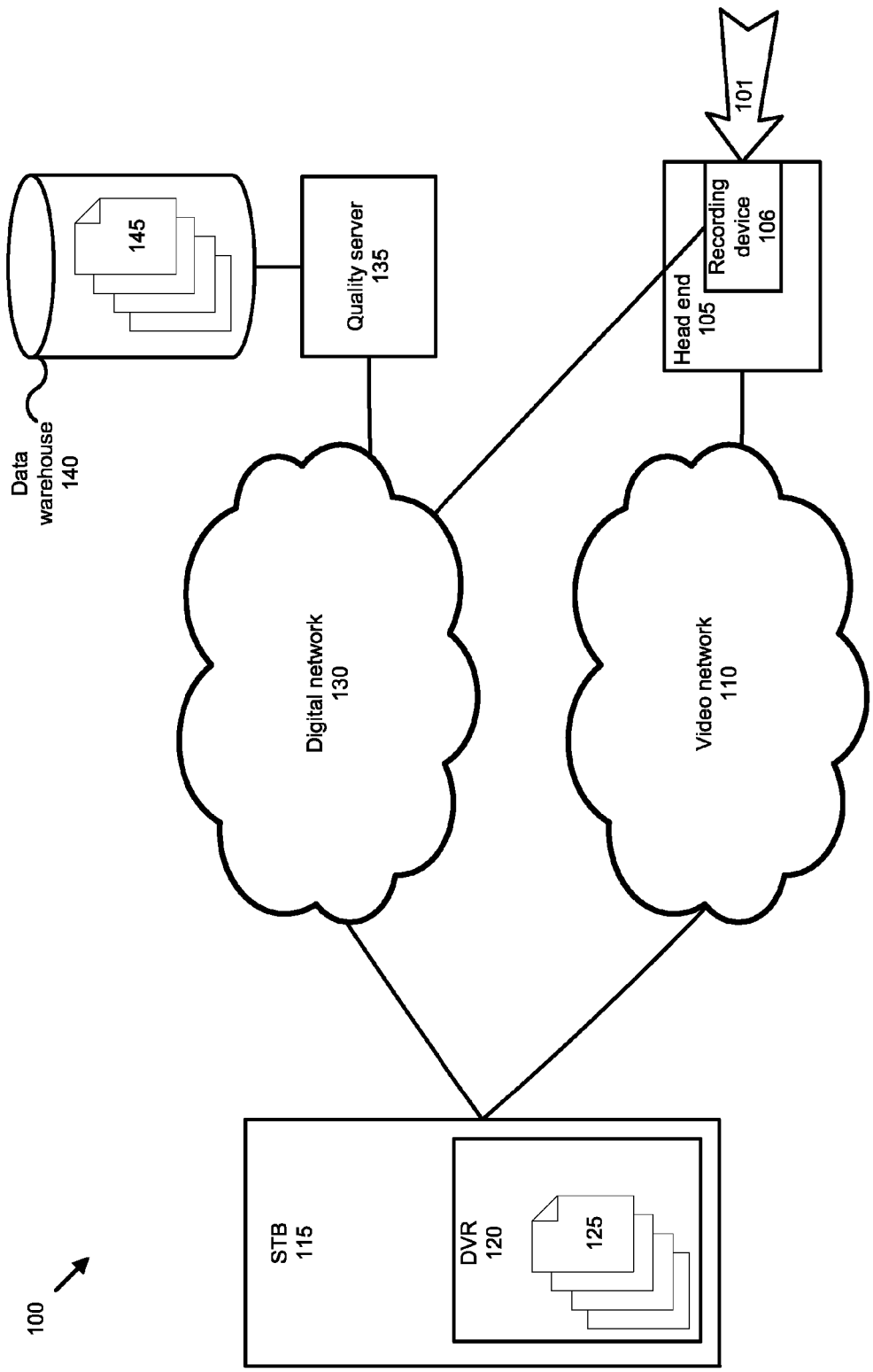
FIG. 1 illustrates a system for evaluating video quality, according to an embodiment.

FIG. 1 illustrates a system 100 for evaluating video quality, according to an embodiment.

Video signal 101 is provided to head end 105 from an external source, such as a satellite. Head end 105 generally includes recording device 106 for recording video signal 101. Recording device 106 may be any suitable known device for recording video signal 101, such as a digital video recorder. Head end 105 provides video signal 101 to video distribution network 110 in a known manner. Video distribution network 110 may include one or more components for known types of video networks, such as digital, optical, or analog networks. Further, video signal 101 may be converted from analog to digital or vice-versa within video distribution network 110. Video distribution network 110 provides signal 101 to set top box (STB) 115. STB 115 is usually, although not necessarily, located at a customer premises such as a residence, hotel, office, etc. subscribing to video services provided via network 110.

STB 115 generally includes a processor capable of executing computer-executable instructions, and well as a medium for storing such instructions. STB 115 is connected to or includes digital video recorder (DVR) 120, and receives video signal 101 from video distribution network 110. Video signal 101 may be output to a monitor or television for display to a user, and may also additionally or alternatively be stored on DVR 120 in sample video files 125. As should be apparent, DVR 120 includes a computer-readable medium for storing digital data, including computer executable instructions and sample video files 125. DVR 120 is generally known for storing video files, although it should be understood that the computer-readable medium DVR 120 need only be capable of storing snippets of video of sufficient size to allow for the testing and evaluation discussed below.

Sample video files 125 may be in any one of a variety of known formats, such as MPEG-2 or MPEG-4, promulgated by the Motion Picture Experts Group. In the event that signal 101 does not provide video data in a format appropriate for storage on DVR 120, either DVR 120 or STB 115 may include hardware and/or software as known to those skilled in the art for converting signal 101 to a format appropriate for storage on DVR 120. However, in some embodiments, video signal 101 is received by STB 115 and stored by DVR 120 in an MPEG format. Further, such embodiments include a known decoder for decoding video signal 101 for viewing, or for decoding files 125 transmission to quality server 135 and comparison to reference files 145 as described further below.

STB 115 is also connected to packet switched network 130. It is to be understood that embodiments are possible in which networks 110 and 130 are in fact a single network used both for providing video signal 101 to STB 115, and for allowing STB 115 to communicate with other network devices. Network 130 is a digital network, and preferably an internet protocol (IP) network.

Quality server 135 communicates with STB 115 through packet switched network 130. Quality server 135 includes computer hardware and software for querying STB 115 for sample video files 125. Quality server 135 further communicates, either through network 130 or some other connection known to those skilled in the art, such as a local area network (LAN), with data warehouse 140. Further, embodiments are possible in which quality server 135 and data warehouse 140 are located on the same physical computing device.

Video reference files 145 may be provided to data warehouse 140 from several sources. For example, known techniques for configuring switches in head end 105 allow for video signal 101 to be captured by recording device 106, thereby creating video reference files 145. Recording device 106 included in head end 105 may be connected to network 130, but in any event may be provided with a way to send video reference files 145 to data warehouse 140, e.g., in response to a query from quality server 135, according to a scheduled job, etc. Further, video reference files 145 may be provided to data warehouse 140 from other devices, such as a server that provides video on demand (VoD) to a user of STB 115.

Quality server 135 may query data warehouse 140 for video reference files 145 for comparison to sample files 125 retrieved from DVR 120. Reference files 145 comprise video images copied from video signal 101 as it is provided to head end 105, as is discussed in further detail below. Accordingly, as also discussed in further detail below, a comparison of sample files 125 to reference files 145 allows for a determination of the quality of video signal 101 as it is received by STB 115.

Computing devices such as STB 115 and those required for quality server 135 and data warehouse 140 may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art. STB 115 generally is a specialized device for receiving video signals 101 from head end 105 via network 110, and may be provided with a proprietary or specialized operating system other than those enumerated above. For example, in one embodiment, STB 115 is provided with a real time operating system (RTOS) such as is known. However, it is to be understood that STB 115 may be a computing device such as one of those enumerated above, so long as the computing device is capable of receiving video signals 101 from network 110 and storing sample files 125.

Computing devices such as STB 115 and those required for quality server 135 and data warehouse 140 generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
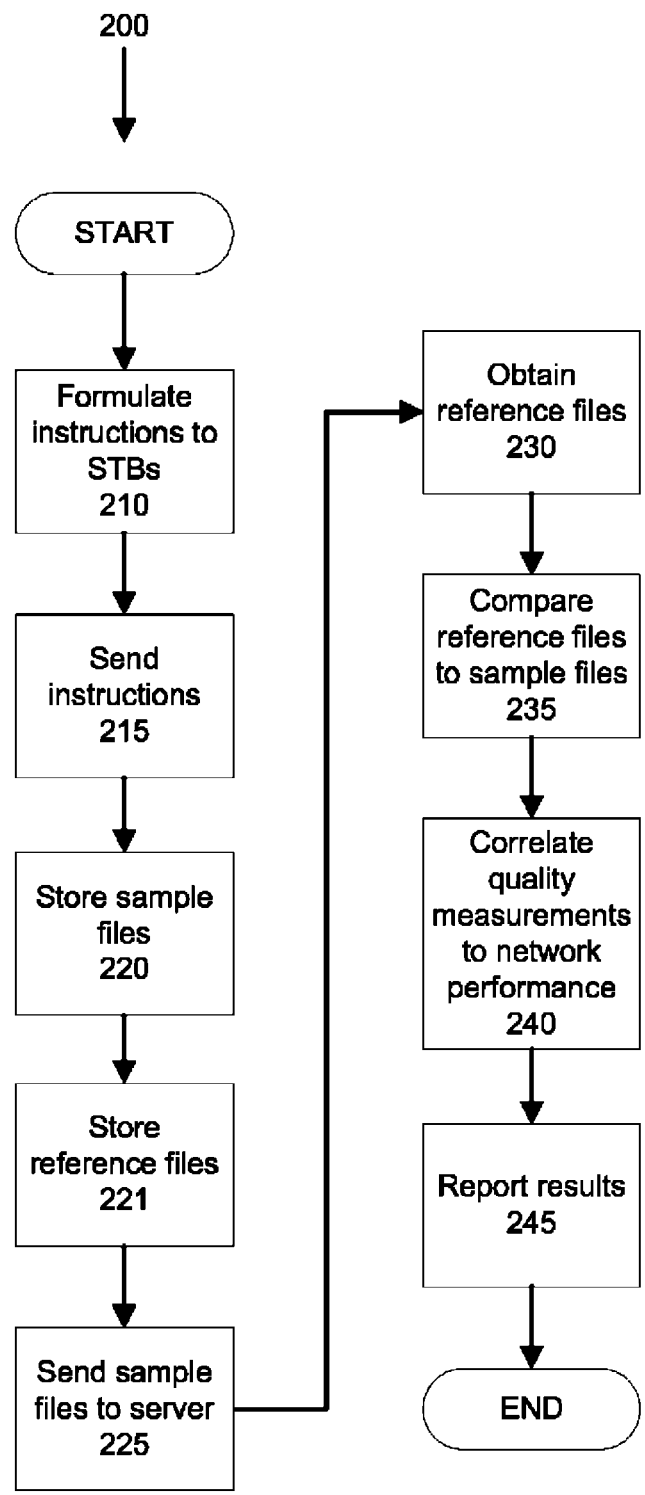
FIG. 2 illustrates a process for making video quality measurements, according to an embodiment.

FIG. 2 illustrates a process 200 for making and using video quality measurements, according to an embodiment.

In step 210, quality server 135 formulates a set of one or more instructions to a plurality of STBs 115 to provide video sample files 125. It is generally preferable that STBs 115 at various customer premises sufficient to provide a valid statistical sample of STBs 115 are queried for sample video files 125. It further may be desirable to obtain sample video files 125 that represent video that customers are actually watching. Accordingly, identified STBs 115 could be limited to a particular geographic region or part of network 110, in which case a predetermined number of STBs 115 in the geographic region could be randomly selected. Further, a set of instructions could be formulated based on knowledge of what programming customers are likely to be watching. In general, it may be desirable to obtain sample video files 125 relating to a variety of programming, e.g., programming on different channels, at different times, and relating to different subject matters. By providing such variety in sample files 125 it is less likely that evaluations and comparisons of a particular sample file 125 will incorrectly suggest that STB 115 is or is not providing video of sufficient quality to a user. Further, such variety will increase the likelihood that, if video quality for a particular program or channel is particularly degraded, such quality issue will be detected.

In any event, the set of instructions formulated in step 210 generally includes instructions to record particular snippets of video received in video signal 101 on DVR 120 as sample video files 125.

Next, in step 215, quality server 135 sends the set of instructions formulated in step 210 to STBs 115 that have been determined as recipients for the instructions. The set of instructions is generally sent via network 130; it will be understood that various addressing schemes are available for locating STB 115 on network 130; e.g., IP addresses may be associated with STB 130, quality server 135, and any other devices on network 130.

It may be preferable for performing process 200 in general, and step 215 in particular, for STB 115 to be equipped with a plurality of tuners for receiving video signal 101 via network 110. When STB 115 is recording video signal 101, e.g., snippet for testing, a digital tuner in STB 115 is tuned to the snippet program for recording, and therefore that tuner may not be available to a user of STB 115 for receiving and viewing desired programming. Accordingly, if STB 115 is equipped with only one tuner, it may be desirable for instructions in step of 215 to make provision for the tuner being in use, e.g., preventing video snippets from being recorded at such time as would interfere with a customer for video services being able to receive desired programming. In general, it is preferable to allow STB 115 to communicate to quality server 135 a refusal to comply with instructions sent in step 215, along with reasons for such refusal, e.g., disk space unavailable, tuner occupied, network difficulties, etc. Known protocols may be used to support such communications, such as simple object access protocol (SOAP) over hypertext transfer protocol (HTTP), etc.

Instructions provided by quality server 135 may be provided according to DSL Forum TR-069, CPE WAN Management Protocol (May 2004), produced by the DSLHome-Technical Working Group (Eds. Jeff Bernstein and Tim Spets), published by the Digital Subscriber Line Forum of Fremont, Calif., and fully incorporated by reference herein in its entirety. TR-069 is a wide area network (WAN)-side customer premises equipment (CPE) management protocol, i.e., a protocol designed for communication between a CPE and an auto-configuration server (ACS). As is known, TR-069 is useful because it provides standardized, interoperable messaging between a remote management system, such as an ACS or quality server 135, and CPE that may have been provided by different vendors. TR-069 thereby enables service providers to invest in a remote management platform that will give them the flexibility to pick and choose amongst available hardware vendors depending on business goals. Accordingly, an ACS in network 130 may control and monitor CPE using TR-069. Quality server 135 may be in communication with, or included within, an ACS.

Next, in step 220, STB 115 records video sample files 125 on DVR 120 according to the instructions received from quality server 135 in step 215. For example, quality server 135 may instruct STB 115 to record video signal 101 for a specified television channel during a specified time period, e.g., using the TR-069 standard as described above. The recorded signal 101 may be stored in a compressed form on DVR 120, although it may be preferable to provide video in decoded form to server 135. Although sending a video sample back to server 135 in decoded form generally uses more bandwidth than providing video in encoded form, it will be understood that sending video in decoded form will likely avoid artifacts in video signal 101 that are due to the encoding-decoding cycle.

When recorded by STB 115, video sample files 125 are generally associated with an identifier according to which video sample file 125 may sent to quality server 135 and stored in data warehouse 140. Further, video sample files are generally stored according to a standard digital video format, such as one of the well known formats promulgated by the Motion Picture Experts Group (MPEG), e.g., MPEG-2 or MPEG-4. It is to be understood that STB 115 may include known hardware and/or software components for converting video signal 101 to an appropriate format for storage as files 125. In one embodiment, video signal 101 is provided in a digital format, e.g., MPEG Transport Streams (MPEG-TS), and video signal 101 may be saved in the form in which it is provided via network 110.

Next, or often contemporaneously with step 220, in step 221, quality server 135 creates reference files 145, and stores them in data warehouse 140. For example, a graphical user interface (GUI) may be provided at quality server 135 for a user to identify snippets of video from which reference files 145 are created. Generally a user selects video programming most frequently viewed or likely to be viewed by customers of network 110, although any video programming provided through network 110 could be selected. In some embodiments, because a GUI can be a cumbersome way to operate a large-scale network monitoring system, an automated network management system (NMS) or the like such as is known to interact through a network monitoring system through a shell language, an application programming interface (API), etc. may be used to select and store snippets of video from which reference files 145 are created. Upon selection of video for creation of a reference file 145, program instructions on quality server 135 are executed to receive a video reference file 145 from recording device 106 in head end 105 containing selected video snippets.

In general, video could be selected for reference files 145 in a variety of ways. For example, video samples could be selected by a human operator, e.g., a user of quality server 135, or by a computer such as quality server 135 that is programmed to select video according to one or more heuristics. Bases for selecting video may include the time of day (known to be correlated with certain patterns of network traffic and or sizes of a viewing audience), complexity of the video signal (i.e., video with more information per unit time is more difficult for compression algorithms to encode and decode correctly, information per unit time being determined by the amount of static detail in the video image, the amount of movement of the images per unit time, and scene cuts, among other factors), and/or by the typicality of video material (e.g., as given by the number of hours per day of similar material presented by one or more channels over video network 110.

Next, in step 225, STB 115 sends sample video files 125 to quality server 135. Transmission of files 125 could be initiated in a variety of ways. For example, instructions provided by quality server 135 to STB 115 in step 215 may include instructions to send sample video files 125 to quality server 135 after such files have been stored on DVR 120. Alternatively, quality server 135 may request sample video files 125 from STB 115 at a time following a time when such files were to have been recorded on DVR 120 according to the instructions sent in step 215. Further, even without instructions from quality server 135 to provide files 125 to quality server 135, STB 115 may be programmed to provide files 125 to quality server 135 at regular intervals, at times when files 125 are available, etc. It should be understood that use of known protocols such as Transfer Control Protocol (TCP) will ensure that files 125 are received in a complete and undegraded state by quality server 135.

Moreover, it is to be understood that embodiments are possible in which a stream of sample video, rather than a video sample file 125 that has been stored on DVR 120, is sent to quality server 135. In such embodiments, STB 115 essentially forwards a selected channel of video signal 101 to quality server 135 at selected times. Further, a stream of reference video in lieu of reference file 145 could be similarly provided. However, the appropriate stream segment from video signal 101 would need to be stored while quality server 135 awaited transmission of a streaming video sample from STB 115. Accordingly, embodiments are possible in which quality server 135 is placed near head-end 105 so that quality server 135 may directly receive. If quality server 135 is too far away from head end 105, it is possible that reference video would be impaired to the same extent as video samples received from STB 115, thereby potentially degrading the measurement capability of system 100.

Next, in step 230, quality server 135 obtains from data warehouse 140 reference files 145 to be compared to sample video files 125 downloaded from STB 115 in step 225. Reference files 145 to be obtained may be identified in a variety of ways, e.g., according to a key, or identifier, included in sample video files 125 by STB 115 according to instructions provided by quality server 135, according to a naming convention, etc. Then, once quality server 135 has received sample video files 125 from STB 115, the key, or identifier, for each file 125 may be extracted from the file 125 and used to retrieve a corresponding reference file 145.

Next, in step 235, corresponding reference files 145 and sample files 125 are compared, and the result of this comparison are used to make a determination of end-to-end video quality provided to STB 115, which determination is then recorded in data warehouse 140. For example, methods documented in International Telecommunications Union Recommendation J.144 Rev. 1, January, 2004 ("J.144") may be used to make a determination of video quality. J.144 is published by the International Telecommunications Union of Geneva Switzerland, and is fully incorporated herein by reference in its entirety. Methods discussed in J.144 compute a quality index based on a pixel-by-pixel comparison between an original reference image and a received image. In addition, it will be understood that there are many possible approaches to combining the pixel-by-pixel differences, and the all-important details differ among the algorithms.

Next, in step 240, end-to-end quality measurements made in step 235 are correlated to network performance metrics corresponding to times when respective sample video files 125 were recorded on DVR 120. It should be understood that end-to-end measurements of video quality, such as those discussed in J.144 or full-reference video quality metrics (FR-VQM), are generally useful by themselves and do not necessarily require other network performance metrics. However, such measurements may be even more valuable when time-synched network performance metrics are available. A variety of performance metrics may be useful, examples of such performance metrics having been provided above. Accordingly, such correlation is useful for determining the relation of video quality received at STB 115 to performance issues in video distribution network 110. For example, if it is known that certain components in network 110 had failed or were not performing according to certain standards at the time a sample video file 125 was recorded, a poor quality measurement based on that file 125 may not be cause for concern. However, if network performance was believed to be good at the time a video file 125 exhibiting poor quality was recorded, then further investigation may be warranted.

Next, in step 245, results of a comparison or comparisons made in step 240 are reported. Such results may be reported in a variety of ways, including by display in a GUI, in an e-mail automatically sent to certain users, in a web page, etc. For example, an exemplary report might include one or more columns of text, such as a column providing values for a full-reference video quality metric obtained using a known heuristic for FR-VQM. Additional columns could include columns for packet loss (% of packets lost), "jitter" (variability of the spacing between packets), and delay (number of milliseconds between sending of a signal and receipt of the signal) associated with the FR-VQM measurement included in the first column. Further, it should be understood that it is possible to compute correlations between FR-VQM measurements and one or more network performance metrics, and that such correlations could be depicted on a graph such as a scatter plot or the like.

Following step 245, process 200 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:
1. A method, comprising:
providing a video signal to a set top box;
sending to the set top box an instruction to record a specified portion of the video signal, thereby creating a video sample;
receiving, from the set top box, the video sample;

specifying a reference video by a heuristic, the heuristic accounting for a time correlated with at least one of network traffic patterns, video signal complexity, and video signal typicality;

obtaining the reference video corresponding to the video sample; and performing a comparison of the video sample and the reference video.

2. The method of claim 1, further comprising specifying the video sample by the instruction at least in part by a particular channel of the video signal during a specified time.

3. The method of claim 1, further comprising specifying the video sample by the instruction at least in part by a particular subject matter.

4. The method of claim 1, further comprising specifying the video sample by the instruction formulated at least in part by popular programming.

5. The method of claim 1, further comprising:

receiving, from the set top box, a refusal to comply with the instruction when the set top box experiences at least one of unavailable disk space, an occupied tuner, and network difficulties.

6. The method of claim 1, wherein the reference video is obtained based on an identifier included in the video sample.

7. The method of claim 1, further comprising:

performing a correlation of end-to-end quality measurements to network performance metrics corresponding to a time of the video sample; and reporting a result based on the comparison and correlation.

8. The method of claim 1, further comprising:

determining if further investigation of the video sample is warranted based on whether components of a network, including the set-top box, performed improperly at a time when the video sample was recorded.

9. The method of claim 1, further comprising:

generating an interface identifying the video sample and a result of the comparison, the result including values for at least one of a full-reference video quality metric, a packet loss, jitter, and delay.

10. A non-transitory computer readable medium storing computer readable instructions that, if executed by a processor of a computer, cause the processor to execute the method of claim 1.

11. A system, comprising:

a device configured to:

provide a video signal to a set top box;

send to the set top box an instruction to record a specified portion of the video signal to create a video sample;

receive, from the set top box, the video sample;

utilize a heuristic to specify a reference video, wherein the heuristic is configured to account for a time correlated with at least one of network traffic patterns, video signal complexity, and video signal typicality;

obtain the reference video configured to correspond to the video sample; and perform a comparison of the video sample and the reference video.

12. The system of claim 11, wherein the video sample is specified by the instruction at least in part by a particular channel of the video signal during a specified time.

13. The system of claim 11, wherein the video sample is specified by the instruction at least in part by a particular subject matter.

14. The system of claim 11, wherein the video sample is specified by the instruction formulated at least in part by popular programming.

15. The system of claim 11, wherein the device is further configured to:

receive, from the set top box, a refusal to comply with instructions sent when the set top box experiences at least one of unavailable disk space, an occupied tuner, and network difficulties.

16. The system of claim 11, wherein the reference video is obtained based on an identifier included in the video sample.

17. The system of claim 11, wherein the device is further configured to:

perform a correlation of end-to-end quality measurements to network performance metrics configured to correspond to a time of the video sample; and report a result based on the comparison and correlation.

18. The system of claim 11, wherein the device is further configured to:

determine if further investigation of the video sample is warranted based on whether components of a network, which includes the set-top box, performed improperly at a time when the video sample was recorded.

19. The system of claim 11, wherein the device is further configured to:

generate an interface configured to identify the video sample and a result of the comparison, the result configured to include values for at least one of a full-reference video quality metric, a packet loss, jitter, and delay.

* * * * *